United States Patent [19]

Tash

[11] Patent Number: 4,768,537
[45] Date of Patent: Sep. 6, 1988

[54] AIR HOSE TO WATER HOSE ADAPTER AND CONNECTOR

[76] Inventor: George Tash, 18658 Chase St., Northridge, Calif. 91324

[21] Appl. No.: 88,233

[22] Filed: Aug. 24, 1987

[51] Int. Cl.⁴ .............................................. F16L 55/18
[52] U.S. Cl. ...................................... 137/15; 137/232; 137/234.5; 137/315; 251/152
[58] Field of Search ...................... 137/231, 232, 234.5, 137/15, 315; 251/152, 149.6; 138/89, 92, 93

[56] References Cited

U.S. PATENT DOCUMENTS

| | | | |
|---|---|---|---|
| 1,991,974 | 2/1935 | Broecker | 137/234.5 |
| 3,207,172 | 9/1965 | Steer et al. | 137/234.5 |

FOREIGN PATENT DOCUMENTS

| | | | |
|---|---|---|---|
| 1019193 | 11/1957 | Fed. Rep. of Germany | 137/234.5 |
| 503882 | 11/1952 | Italy | 137/234.5 |

*Primary Examiner*—A. Michael Chambers
*Attorney, Agent, or Firm*—John J. Posta, Jr.

[57] ABSTRACT

The air hose to water hose adapter includes a water hose connector having a first cylindrical tube at the front thereof adapted to be rigidly connected to a hose line, and a rear, second larger cylindrical tube, internally threaded, rotatably connected to the first tube. A novel air hose connector is releasably received in the rear portion of the water hose connector and includes an externally threaded generally cylindrical fitting which can abut an internal shelf in the water hose connector and has a central passageway therein, and an elastomeric plug releasably secured in that fitting passageway. The plug has a rounded front end adapted to protrude into the first tube of the water hose connector and plug it tight. The plug front end has a rear flange or shelf which seats firmly in a recessed ring at the front of the air hose fitting, and the plug also has an elongated intermediate portion in the fitting passageway, with external sealing ring engageable with the fitting. The rear end of the plug protrudes through the rear of the fitting and bears an air hose nipple and cap. The nipple communicates with a central air channel running the length of the plug. The rear of the air hose fitting has an integral hex nut which, along with the air hose nipple, is useful for screwing the air hose connector as a unit into and out of the water hose connector.

14 Claims, 1 Drawing Sheet

AIR HOSE TO WATER HOSE ADAPTER AND CONNECTOR

BACKGROUND OF THE INVENTION

1. Field of the Invention

The present invention generally relates to fluid adapters and, more particularly, to an improved air hose to water hose adapter and air hose connector.

2. Prior Art

It is important for various applications such as in various chemical processing steps, and also in the temporary plugging of drain pipes for test purposes, to be able to provide both water hose connectors and air hose connectors for certain lines. Certain of such devices have been devised to serve both purposes. See, for example, U.S. Pat. No. 4,660,603. However, most such dual devices are expensive to make and repair, difficult to use and inefficient.

It would be desireable to be able to provide an improved type of air hose to water hose adapter which is simple and inexpensive to make and use, is efficient and is durable.

SUMMARY OF THE INVENTION

The improved air hose to water hose adapter of the present invention satisfies all the foregoing needs. The adapter is substantially as set forth in the Abstract. Thus, it includes a water hose connector having a first cylindrical tube at the front thereof adapted to be rigidly connected to a water hose. It also includes a larger, rear, second cylindrical tube, internally threaded, rotatably connected to the first tube and forming an internal shelf therewith.

An improved air hose connector is threadably releasably received in the rear of the second tube and includes an externally threaded cylindrical fitting which abuts the shelf and has a central passage running therein and an elastomeric plug releasably secured in that passage. The plug has a rounded front end adapted to protrude into the first tube of the air hose connector and seal it tight. The plug front end has a rear flange which firmly seats in a recessed ring in the front of the air hose fitting.

The plug has an elongated intermediate portion with external sealing ring engageable with the interior of the fitting. The rear end of the plug protrudes through the rear of the fitting and bears an air hose nipple and cup. The nipple has a depressible pin leading to a central air passage through the length of the plug. The rear of the air hose fitting has a hex nut to facilitate screwing the air hose connector into and out of the water hose connector. The device is simple, small, durable and efficient in converting a water hose with attached connector for use with compressed air.

Further features of the invention are set forth in the following detailed description and accompanying drawings.

DRAWINGS

DETAILED DESCRIPTION

FIGS. 1-8

Figure 1:
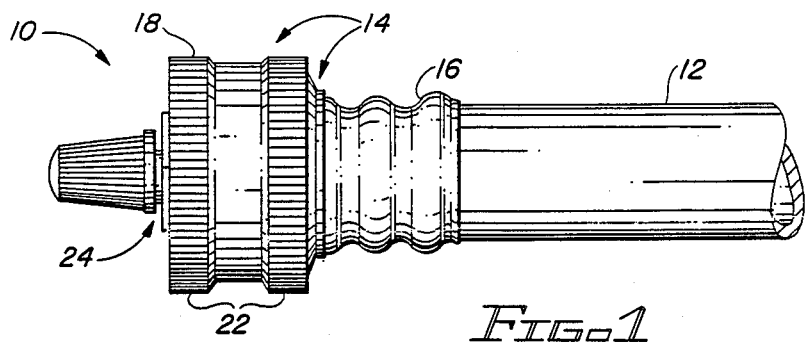
FIG. 1 is a schematic side elevation of a preferred embodiment of the improved air hose to water hose adapter of the present invention, shown connected to a hose line.
Figure 2:
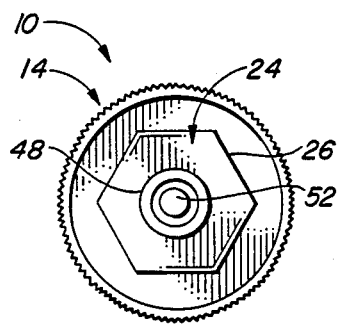
FIG. 2 is a schematic rear elevation of the adapter of FIG. 1 with the cap thereof removed.
Figure 3:
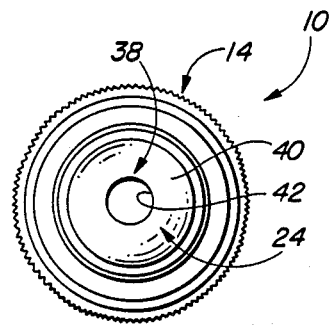
FIG. 3 is a schematic front elevation of the adapter of FIG. 1.
Figure 4:
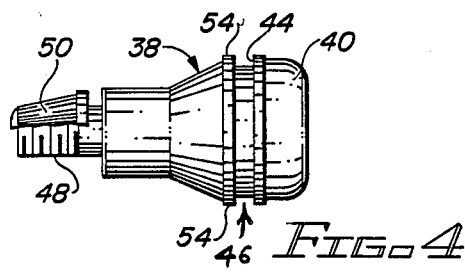
FIG. 4 is a schematic side elevation, partly broken away, of the plug, rear nipple and cap portions of the adapter of FIG. 1.
Figure 5:
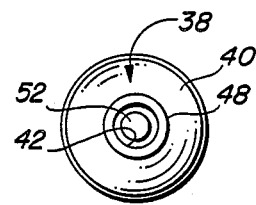
FIG. 5 is a schematic front elevation of the plug of FIG. 4.
Figure 6:
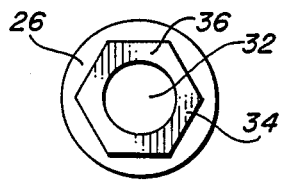
FIG. 6 is a schematic rear elevation of the air hose fitting of the adapter of FIG. 1.
Figure 7:
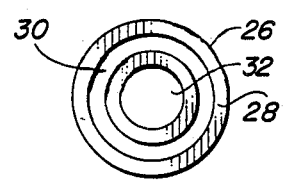
FIG. 7 is a schematic front elevation of the air hose fitting of FIG. 6.

Now referring to the drawings, a preferred embodiment of the improved air hose to water hose adapter of the present invention is schematically depicted therein. Thus, adapter 10 is shown. In FIG. 1, adapter 10 is illustrated connected to a hose 12.

Figure 8:
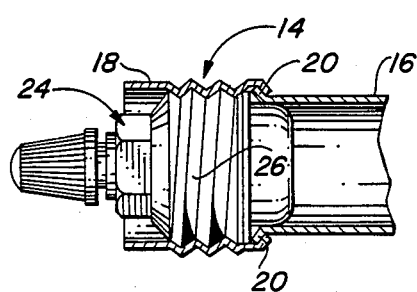
FIG. 8 is a schematic side elevation, partly in section, of the air hose connector portion of the adapter of FIG. 1 in the water hose connector of the adapter.

Adapter 10 includes a water hose connector 14 which comprises a ringed relatively small diameter, hollow cylindrical front tube 16 rigidly connected over one end of hose 12, and a hollow cylindrical internally rear tube 18 of greater diameter rotatably connected to tube 16 so as to form an internal shelf 20 therewith (FIG. 8). Connector 14 can be of a conventional type which is adapted to threadably receive an externally threaded water hose fitting (not shown) in tube 18. Tube 18 may have knurled rings 22 to facilitate rotation thereof for such purposes.

Adapter 10 includes a novel air hose connector 24 which has a generally cylindrical externally threaded fitting 26 having a front end 28 bearing a recessed ring 30 around a central cylindrical passageway 32 extending the length thereof. The rear end 34 of fitting 26 bears an integral hexagonal nut 36 which protrudes rearwardly to facilitate screwing fitting 26 into and out of the rear of tube 18.

Passageway 32 releasably receives an elastomeric generally cylindrical plug 38 having an expanded and rounded front end 40 adapted to protrude into tube 16 and seal it shut (FIG. 8) when plug 38 is seated in fitting 26 and the latter is screwed all the way into tube 18 until it abuts shelf 20 (FIG. 8).

Plug 38 has a central air passageway 42 extending the length thereof. Front end 40 of plug 38 is inserted into fitting 26 from the front end 28 thereof; thus holding plug 38 sealingly engaged with fitting 26. Plug 38 has an elongated generally cylindrical intermediate portion 46 extending through passageway 32 and protruding out the rear thereof, terminating in a conventional cylindrical hollow threaded air hose nipple 48 with removable cap 50. Nipple 48 has a spring biased pin 52 therein releasably sealing off passageway 42 into which nipple 48 is connected. Portion 46 has an external elastomeric sealing ring 54 adapted to sealingly engage the interior of fitting 26 to prevent loss of air therearound and to hold plug 38 firmly in place therein and also includes flange 44 which firmly seats in recessed ring 30. Thus, fitting 26 and plug 38 with attached nipple 48 can be screwed as a unit comprising connector 24 readily into and out of tube 18 by the use of nut 36 and, if desired, using cap 50 of nipple 48 when screwing connector 24 into tube 18. FIGS. 1 and 8 show connector 24 fully installed in connector 14 to form the desired adapter 10.

Fitting 26 and cap 50 preferably are of hard durable plastic, but can be of metal or ceramic, if desired. Plug 38 preferably is of synthetic or natural rubber or plastic and tubes 16 and 18 and nipple 48 are preferably of steel or other metal.

Adapter 10 effectively permits pressurized air to be passed into hose 12 through nipple 48 and passageway 42 when connector 24 is firmly in place in connector 14 as shown in FIGS. 1 and 8. Adapter 10 is efficient, easy and rapid to install and use, durable and inexpensive. It can be made in any convenient size to fit standard hose couplings. Further features of the invention are set forth in the foregoing.

Various modifications, changes, alterations and additions can be made in the improved adapter and air hose connector of the present invention, their components and parameters. All such modifications, changes, alterations and additions as are within the scope of the appended claims form part of the present invention.

What is claimed is:

1. An improved air hose to water hose adapter, said adapter comprising, in combination:
    (a) a water hose connector comprising:
        i. a first hollow cylindrical front portion adapted to be rigidly connected to the outer periphery of a hose line; and,
        ii. a second hollow cylindrical rear portion secured for free rotation around the rear end of said first portion and bearing internal threading adapted to connect with external threading on a water hose, said first and/or second hollow tubular portions forming an internal shelf against which an end of a water hose can abut; and,
    (b) an air hose connector releasably received in said second portion of said water hose connector, said air hose connector, comprising,
        i. an externally threaded generally cylindrical fitting adapted to be threaded into said second portion of said water hose connector and seat against said shelf, said fitting having a central cylindrical passageway extending longitudinally therethrough and a recessed ring portion at the front end thereof around said passageway, and,
        ii. an elongated elastomeric plug extending longitudinally through said fitting, said plug having a central air passageway longitudinally extending therethrough and having an expanded front end adapted to releasably fill and seal the rear end of said first portion of said water hose connector, said plug front end having a rear peripheral flange adapted to seat into and sealingly engage said recessed ring portion, said plug including an elongated generally cylindrical intermediate portion connected to said front end and also to a rear air hose nipple bearing a removable cap, said nipple communicating with said plug central passageway, whereby said air hose connector can be readily and rapidly fitted into and removed from said second portion of said water hose connector.

2. The improved adapter of claim 1 wherein said second portion of said water hose connector has a larger diameter than said first portion of said water hose connector and wherein said air hose fitting has an integral external hexagonal nut at the rear end thereof to facilitate threading of said air hose connector into said second water hose connector portion.

3. The improved adapter of claim 2 wherein said elongated generally cylindrical intermediate plug portion has an external elastomeric sealing ring spaced rearwardly of said front flange for sealing engagement with said air hose fitting.

4. The improved adapter of claim 3 wherein said air hose nipple extends rearwardly of said air hose fitting, and wherein said air hose fitting and plug releasably seal together and are insertable into and removable from said water hose connector second portion as a unit.

5. The improved adapter of claim 4 wherein said air hose nipple and cap are usable to facilitate screwing of said air hose connector into said water hose connector.

6. The improved adapter of claim 5 wherein said air hose fitting comprises plastic, wherein said plug front end is rounded and said plug comprises rubber, and wherein said air hose nipple and said water hose connector are metal.

7. An improved air hose connector for insertion in a water hose connector, said air hose connector including,
    (a) an externally threaded generally cylindrical fitting adapted to be threaded into an internally threaded cylindrical water hose connector tube, said fitting having a central passageway extending longitudinally therethrough and a recessed ring portion at the front end thereof around said passageway;
    (b) an elongated elastomeric plug having a central air passageway through the length thereof and an expanded front end integral therewith to protrude into and releasably seal the interior of a water hose connector, said plug having a rear flange adapted to seat in said recessed ring portion, and having an elongated generally cylindrical middle portion extending through said fitting passageway and terminating in a rear air hose nipple and which protrudes from the rear end of said fitting and which bears a removable cap, said nipple communicating with said plug passageway.

8. The improved air hose connector of claim 7 wherein said air hose fitting has an integral hexagonal nut at the rear end thereof to facilitate threading of said air hose connector into a water hose connector.

9. The improved air hose connector of claim 8 wherein said cylindrical middle portion of said plug sealing ring for sealing engagement with said fitting.

10. The improved air hose connector of claim 9 wherein said air hose fitting comprises plastic, wherein said plug comprises rubber and has a rounded front end and wherein said nipple is metal with a depressible spring load center pin.

11. The method of converting a water hose to an air hose comprising:
    (a) providing a fitting adapted to be threaded into an internally threaded cylindrical water hose connector tube, said fitting having a central passageway extending longitudinally therethrough and a recessed ring portion at the front end thereof around said passageway,
    (b) providing an elongated elastomeric plug having a central air passageway through the length thereof and an expanded front end integral therewith adapted to protrude into and releasably seal the interior of a water hose connector, said plug having a rear flange adapted to seat in said recessed ring portion, and having an elongated generally cylindrical middle portion extending thorugh said fitting passageway and terminating in a rear air hose nipple which protrudes from the rear end of said fitting and which bears a removable cap, said nipple communicating with said plug passageway,
(c) disposing said plug within said fitting to form a conversion unit, and
(d) threading said conversion unit into an internally threaded cylindrical water hose connector tube, whereby said water hose is now able to be connected to a source of air under pressure to convey air instead of water.

12. The method of claim 11, wherein said air hose fitting has an integral hexagonal nut at the rear end thereof to facilitate threading of said air hose connector into a water hose connector.

13. The method of claim 12 wherein said cylindrical middle portion of said plug has an external elastomeric sealing ring for sealing engagement with said fitting.

14. The method of claim 13 wherein said air hose fitting comprises plastic, wherein said plug comprises rubber and has a rounded front end and wherein said nipple is metal with a depressible spring loaded center pin.

* * * * *